Figure 1:
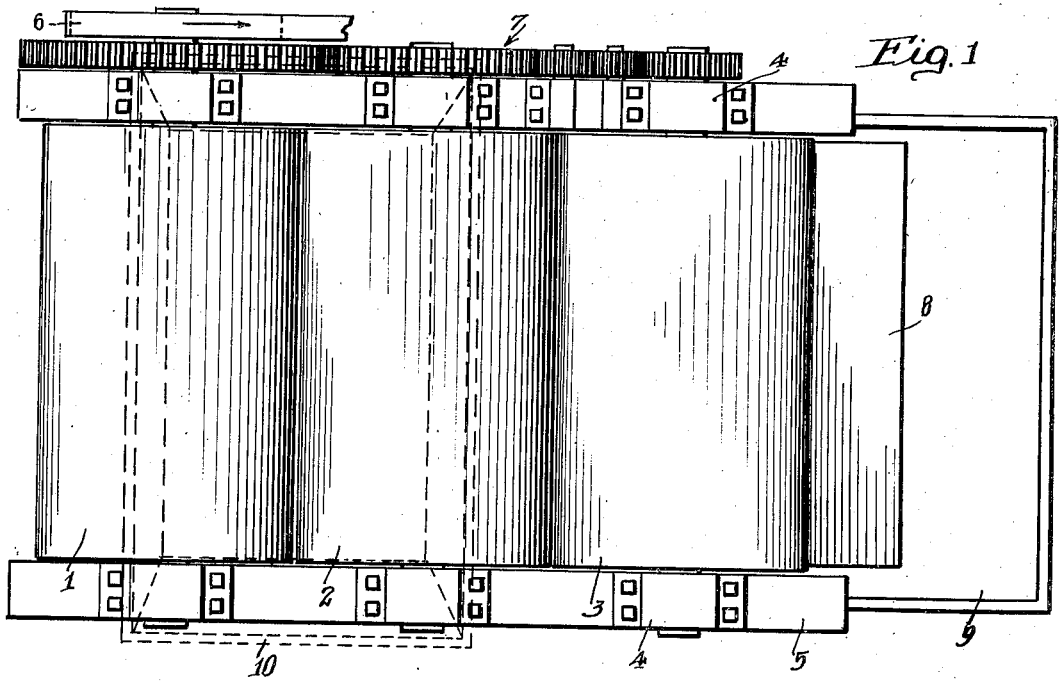

May 14, 1940.  T. W. HALLIDAY  2,200,774

METHOD FOR PREPARING AGAR AGAR FLAKES

Filed Dec. 9, 1935

INVENTOR.
Thomas W. Halliday
BY Lyon & Lyon
ATTORNEYS

Patented May 14, 1940

2,200,774

UNITED STATES PATENT OFFICE 2,200,774

METHOD FOR PREPARING AGAR-AGAR FLAKES

Thomas W. Halliday, Los Angeles, Calif.

Application December 9, 1935, Serial No. 53,566

5 Claims. (Cl. 167—56)

This invention relates to improvements in the preparation of agar-agar, or similar gelatinous substances for physiological consumption, and more particularly to the method of preparing flakes of agar-agar, or similar gelatinous substances, to the flaked physiological product of agar-agar and to the apparatus for use in the preparation of such physiological products.

The ordinary agar-agar of commerce is found mainly in what is known as "strip" agar. This strip agar is a ribbon about one-half millimeter thick, three millimeters wide, and of varying length. The usual method heretofore employed in the preparation of strip agar for physiological consumption is to chop the ribbon in varying lengths of from one-fourth to two inches, in which form it is generally known in the trade as "flaked agar."

In the physiological consumption of chopped strips of agar, when the agar is soaked in water, it softens and swells to several times that of its dry state, and can thus be eaten. This chopped agar, however, retains a toughness and is difficult to chew or swallow and contains a degree of structural rigidity which may prove harmful for certain physiological uses.

In order to overcome the difficulties found in the use of this chopped agar, both from a manner of inducing the patients to use the product and likewise to overcome objections to its use for certain physiological purposes, it is the object of this invention to provide an improved flaked agar or improved flaked product having similar gelatinous characteristics with agar by producing a very thin, fluffy flake in which form the agar completely softens and fluids so as to be nonirritating and in which form of fluffy flake the agar may be readily drunk or swallowed.

A further object of my invention is to produce a flake of agar-agar or other substance having similar gelatinous character, which flake is in such form as to permit readily absorption of fluids to a state of saturation or supersaturation to eliminate the absorption of moisture from the intestinal tract by the agar.

Another object of this invention is to provide fine flakes of agar-agar, or other similar substances having gelatinous characteristics, which flakes will freely suspend in liquid without "balling up" so that upon ingestion of the fine flakes, an intimate mixture is had between the flakes of agar-agar and the food residue in the stomach or bowel.

Another object of this invention is to provide a method by which agar-agar, or other similar gelatinous substance, may be flaked to form fluffy, extremely thin flakes.

Other objects and advantages of this invention it is believed will be apparent from the following detailed description of a preferred embodiment thereof.

In the drawing I have diagrammatically illustrated apparatus applicable for the flaking of agar, or other similar gelatinous substances, and in the drawing Figure 1 is a diagrammatic top plan view of the apparatus.

Figure 2:
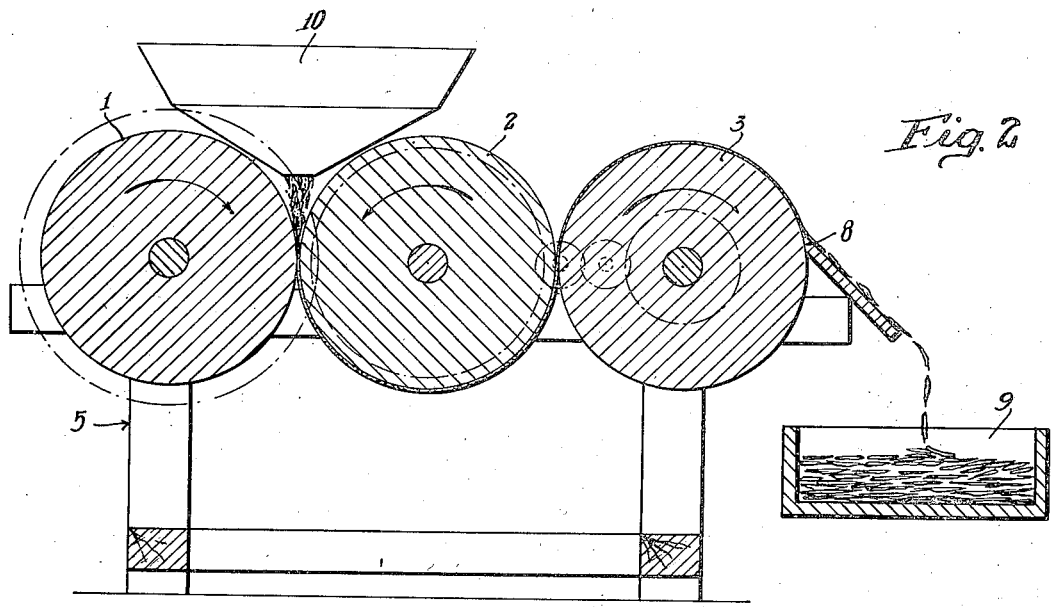

Fig. 2 is a mid-sectional elevation.

I have found that when an effort is made to flake agar-agar, or other similar gelatinous products, in the moist state, that the flakes adhere to the flaking rolls or apparatus and gum up so that the operation is rendered difficult, if not impossible.

I have further found that if an effort is made to flake agar-agar, or other similar gelatinous substance, in the dry state, that the agar is reduced to a powder when subjected to the action of crushing or flaking machinery. Such a powder does not lend itself readily to physiological consumption because of its tendency to lump up when moistened.

I have found that the difficulties as heretofore set forth with respect to the flaking of agar, or other gelatinous objects, may be overcome by the addition to the agar of suitable lubricating agencies, and that when such suitable lubricating agencies are added to the agar, that it is possible to flake the agar to produce an extremely thin fluffy flaked agar product.

I have found that agar, or other similar gelatinous products, may be flaked to produce fluffy, thin flakes by first moistening or tempering the agar to the proper degree, then adding a suitable lubricating media to the agar and passing the tempered agar and lubricating media between flaking rolls. If desired the lubricating agent may be removed and the agar flakes dried.

I have further found that by proper selection of the lubricating media, the necessity of removing the lubricating media may be avoided, by using a form of lubricating media that is not antagonistic to the final use of the product. The lubricating media selected may be animal, vegetable, or mineral oils, or such other compounds or products as will act as a lubricant between the agar and the flaking surfaces by lowering the gelatinous face of the agar-agar in an amount sufficient to prevent gumming or sticking of the flakes of the agar to the flaking surfaces. The agar-agar flakes as prepared may be divided into two general classes: First, those agar-agar products where a non-food value product is desired, and second, those agar-agar products where it is desired to add food value, mineral content or nutritive elements. In the first of the cases, i. e., of the non-food value product, lubricating media employed may be a mineral oil or psyllium seed. In the second case where it is desired to add food value mineral content or nutritive elements to the agar-agar flakes, the lubricating media may be vegetable or animals fats, soya beans, sesame seeds, flax seed, alfalfa meal or vegetable concentrates. In the case where it is desired to form thin, fluffy flaked agar without the addition of any matter thereto, the flaked agar-agar may be prepared by the addition of a lubricating media consisting of an oil and then by leaching from the flakes with a suitable solvent the oil used as a lubricant.

As an illustrative example of the agar-agar flakes prepared in acccordance with my invention and of the process used in the preparation of such agar-agar flakes, the following illustrative examples are given:

In the illustrative examples given, I have divided the lubricating media into what I term solid and fluid lubricants. As fluid lubricants I class oils, fats, butters or greases, and as solid lubricants I include seeds, meals and vegetable concentrates. In the particular illustrative example given, I employ as a solid lubricant psyllium seeds; and employ a flaking apparatus preferably of the following general characteristics;

The flaking apparatus preferably includes a series of three smooth cylindrical flaking rolls 1, 2 and 3, each of which is supported on a shaft journaled in bearings 4 upon a frame 5. Means are provided for driving the rolls 1, 2 and 3, which means may be of any suitable or desirable form and are herein illustrated as including a belt pulley 6 mounted upon the shaft of one of the cylindrical rolls. The shaft of the other cylindrical rolls may be geared to the shaft upon which the pulley 6 is secured as, for example, through a train of gears 7, so that each of the rolls 1, 2 and 3 is driven at the proper speed and in the proper direction of rotation. The rolls 1, 2 and 3 are rotated in a direction so that each roll rotates in the same direction as the roll adjacent thereto. Rolls 1, 2 and 3 are spaced apart so that their peripheries are within approximately one-thousandth of an inch of each other and the peripheries of the cylindrical rolls are ground to the greatest possible accuracy. The rolls 1, 2 and 3 are driven at differential speeds so that as the product is flaked, it is taken from the slower driven roll by the faster driven roll and transferred in this manner through the series of rolls 1, 2 and 3. As an illustrative example, roll 1 is driven at 75 R. P. M.; roll 2 at 150 R. P. M., and roll 3 at 300 R. P. M.

A scraper or knife 8 is positioned adjacent the surface of the last roll 3 to remove from the periphery of the roll 3 the flaked product and permit the flaked product to drop into a receptacle 9. A hopper 10 is mounted over rolls 1 and 2 so that the product to be flaked is delivered between the rolls 1 and 2. The use of the differential speed of drive of the rolls 1, 2 and 3 results in the stretching action of the cellular structure so that the cellular structure is effectively disrupted as it is induced to the desired degree of thinness passing through the flaking apparatus.

On employing apparatus of the character as above set forth, and using in conjunction with agar-agar psyllium seed as a lubricating agent, I prefer to proceed as follows:

The proportion of psyllium seed required to furnish proper lubrication or for the lowering of the gelatinous phase of the agar varies in accordance with the moisture content of the mixture of agar-agar and psyllium seed and with the temperature generated during the flaking operation by the rolls 1, 2 and 3. In practice, the amount of psyllium seed utilized as a lubricating agent for the agar-agar may be approximately 25% psyllium seed to 75% agar. As desired, however, depending upon the product to be produced, the psyllium seed percentage may be increased to any maximum desired.

In preparing the psyllium agar flakes, I prefer to employ 25% agar and 75% psyllium seed. With these preferred percentages of agar and psyllium, I have found that by the addition of 20% moisture the resultant mixture of agar-agar, psyllium seed and moisture handles to advantage. Because of the dissimilar characteristics of psyllium seed and agar, I prefer to temper each of the ingredients separately. I have found that if too much water is added to the psyllium seeds, there is a tendency for the seeds to become sticky with the result that they become difficult to handle. I have also found that the agar may be readily handled even after adding water equal to two or three times its weight. When using the percentages as heretofore set forth, 25% agar, 75% psyllium seed, I prefer to temper the dry agar by adding 60% water and allowing it to stand until of uniform moisture content.

The example as given is using ordinary commercial agar sold as dry agar. To the ordinary commercial psyllium seed I add 15% water and agitate the seeds to prevent sticking together until the surface moisture is absorbed and then allow the seeds to stand until of uniform moisture content. The tempered psyllium seeds and agar are then intimately mixed and fed through the hopper 10 to the rolls 1, 2 and 3.

In order to obtain a more intimate mixture of the psyllium seeds and agar, I have found that the intimacy of the mixture may be increased by first running separately the tempered psyllium seeds through the flaking apparatus consisting of the rolls 1, 2 and 3, to flake the psyllium seeds. This produces a ribbon of psyllium seeds. I then break the ribbon up into flakes by passing this ribbon through a coarse sieve of approximately ¾ inch mesh. The psyllium flake is then mixed with the tempered agar and then the mixture run through the flaking apparatus. The advantage accomplished by this operation is that by first flaking the psyllium seeds the volume of the psyllium seeds becomes about equal to that of the agar and a more uniform mixture is readily obtained to prevent the bunching of the agar and the consequent gumming of the bunched agar in the rolls.

I have found that as a general rule the hotter the rolls 1, 2 and 3 become during the operation, the higher the moisture content should be to prevent excessive drop-off of the flakes from between the rolls. I have further found that when the moisture content is too high, the flakes have a tendency of gumming up on the knife. In addition, too high a moisture content increases the cost of final dry.

In obtaining the most effective operation I have found that where the psyllium seeds alone are flaked as hereinabove set forth, it is preferable to maintain the rolls at a temperature below 100° F. I have found also that in running the mixture of the psyllium agar through the flaking apparatus that it is preferable to employ a higher temperature of approximately 200° F. In using the psyllium agar mixture, the higher temperature is preferable as the addition of the agar has brought the moisture content of the mixture up to a sufficient degree to prevent excessive drop-off of the flakes from the surface of the rolls. The use of higher temperatures also brings the temperature of the flakes up to a point where the evaporation of the moisture is increased and the consequent drying cost is reduced. The moisture content of the psyllium agar mixture may be altered moderately above and below the optimum above given. With any given mixture the desirable moisture content is a function of roll temperature and speed, and with an increase in roll temperature, a higher moisture content may be used. Under any given condition of temperature of the rolls 1, 2 and 3, and speed of operation, the optimum moisture content becomes quite critical and it is found that in operating the flaking apparatus that as temperature changes occur the moisture content of the mixture of agar and psyllium seeds as fed to the flaking apparatus may be varied slightly during operation to meet the changing conditions of operation.

It is desirable to use the rolls 1, 2 and 3 at a constant temperature by utilizing some form of cooling means for holding the rolls at a constant temperature. The maintaining of the rolls at a constant temperature obviates the necessity of altering the moisture content during processing.

As an example of producing agar flakes by using a fluid medium to prevent adhering to the rolls, I employ liquid petrolatum or the so-called mineral oil common in trade. In using both mineral oil and water or moisture to condition the agar for flaking, it is preferable to first soak the dry agar in the oil to insure deep penetration so the flaking process does not expose sticky surfaces of the agar to the rolls. When using a roll temperature of approximately 100° F. I add to the dry agar approximately two-thirds of an ounce of heavy liquid petrolatum to each pound of dry agar. After the oil is added, the dry agar is allowed to stand until the oil is uniformly distributed and the penetration complete. The oiled agar is then moistened by adding water to the extent of approximately 25% per unit of agar employed. The agar and water are allowed to stand until the agar is tempered with the moisture and the moisture distribution is substantially uniform. The mixture of oil, agar and water is then run through the flaking apparatus substantially as heretofore set forth and the flakes are then dried to remove the moisture content.

The flakes may be dried by spreading the same out in shallow pans or trays and exposing the same to the air.

In case it is desirable to use higher roll temperatures in order to facilitate drying, I use about one ounce of heavy liquid petrolatum per pound of agar and increase the moisture content about 5%.

The only limit to the roll temperature that might be used in either flaking process described is that the roll temperature must be kept below the point where disintegration of the product occurs.

In using liquid petrolatum as a lubricating medium, I have found that for each roll temperature selected there is an optimum oil moisture balance. If too much oil is used, difficulty in feeding the rolls is encountered. If too little oil is used, the agar will gum up the rolls. If too little water is added, the agar will be hard to feed and excessive pressure will be required to produce thin flakes and the drop-off from the rolls will be excessive. If too much water is used, the rolls will gum up, or a gummy mass will collect at the knife 8 instead of thin flakes being discharged, and an excessive amount of drying will be required.

If after the preparation of fluffy agar flakes using liquid petrolatum it is desired to remove the oil from the flakes, the oil may be leached from the flakes by use of a suitable solvent such as carbon tetrachloride.

In preparing the agar flakes in accordance with my invention, the agar is reduced to a form where the flakes are of a thickness the appearance of which resembles that of very fine tissue paper, and as the rolls of the flaking apparatus are set so that their peripheries are within one-thousandth of an inch or less of each other, the actual thickness of the flakes themselves is in all probability less than one-thousandth of an inch.

Having fully described my invention, it is to be understood that I do not wish to be limited to the details herein set forth, but my invention is of the full scope of the appended claims.

I claim:

1. In a process of preparing flakes of agar-agar, the steps of tempering the agar, adding a lubricant to the agar, and then passing tempered agar and lubricant between rolls.

2. A process of preparing agar-agar flakes, including the steps of tempering the agar, adding a liquid lubricating media thereto, and then passing between rolls the agar and lubricant to reduce the agar under the influence of pressure and extension of the cellular structure thereof to produce flakes.

3. A process of preparing flakes of agar-agar which consists in tempering the agar, adding a solid lubricant thereto, and then passing the solid lubricant and agar between rolls to flake the agar and solid lubricant.

4. A process of preparing flakes of agar-agar and psyllium seeds, which includes the steps of tempering the agar, tempering the psyllium seeds, mixing the tempered agar and psyllium seeds together, and passing the mixture of tempered agar and psyllium seeds between rolls under pressure to produce flakes of agar and psyllium seeds.

5. A process of preparing agar-agar flakes, including the steps of tempering the agar-agar, adding a lubricant thereto, and then subjecting the agar-agar and lubricant to the action of pressure, and stretching the agar-agar.

THOMAS W. HALLIDAY.